(12) United States Patent
Pfisterer

(10) Patent No.: US 6,550,705 B2
(45) Date of Patent: Apr. 22, 2003

(54) MOVABLE COMMINUTING APPARATUS FOR TURF GROOMING

(76) Inventor: James W. Pfisterer, 205 Country Day Rd., Chester, MD (US) 21619

( * ) Notice: Subject to any disclaimer, the term of this patent is extended or adjusted under 35 U.S.C. 154(b) by 0 days.

(21) Appl. No.: 09/814,098

(22) Filed: Mar. 22, 2001

(65) Prior Publication Data

US 2002/0134869 A1 Sep. 26, 2002

(51) Int. Cl.[7] .............................. B02C 9/04; B02C 34/43
(52) U.S. Cl. ...................... 241/101.76; 241/55; 241/56; 241/101.763
(58) Field of Search ........................ 241/55, 56, 101.76, 241/101.763

(56) References Cited

U.S. PATENT DOCUMENTS

| | | | | | |
|---|---|---|---|---|---|
| 3,472,298 | A | * | 10/1969 | Vinogrador et al. | ... 241/101.72 |
| 3,856,218 | A | * | 12/1974 | Harmon et al. | ........ 241/101.76 |
| 4,945,716 | A | * | 8/1990 | Murakawa et al. | .......... 56/13.3 |
| 4,998,861 | A | * | 3/1991 | Fukuzawa et al. | .......... 415/206 |
| 5,018,346 | A | * | 5/1991 | Ishimaru et al. | ............... 56/202 |
| 5,254,177 | A | * | 10/1993 | Chauvin | ........................ 134/6 |
| 5,367,864 | A | * | 11/1994 | Ogasawara et al. | ......... 180/900 |
| 5,586,731 | A | * | 12/1996 | Glaze et al. | ................. 172/119 |
| 5,778,646 | A | | 7/1998 | Pfisterer | |
| 6,098,387 | A | | 8/2000 | Pfisterer | |
| 6,122,903 | A | * | 9/2000 | Hayashi et al. | ............... 56/15.7 |
| 6,170,242 | B1 | * | 1/2001 | Gordon | ............... 280/124.141 |

* cited by examiner

*Primary Examiner*—William Hong
(74) *Attorney, Agent, or Firm*—Dennison, Schultz & Dougherty

(57) ABSTRACT

A comminuting mechanism is disclosed that includes a rotatable drive shaft which supports a plurality of blades, each blade having both straight arms and arms having angled tip portions. The shaft and blades are supported on a frame within a hood, and the frame is pulled along a ground surface by a tractor or other vehicle. Debris is pulled into the housing by the combined action of the forward motion of the vehicle and an inward airflow generated by fan members on the rotating blades, pulverized by the action of the blades, and discharged through an outlet.

10 Claims, 5 Drawing Sheets

MOVABLE COMMINUTING APPARATUS FOR TURF GROOMING

TECHNICAL FIELD

The present invention relates generally to a comminuting apparatus, and more particularly, to a movable apparatus for comminuting debris on a golf course or other ground surface.

BACKGROUND OF THE INVENTION

Golf courses, playing fields, and other turf surfaces are frequently subjected to heavy traffic and thus require frequent maintenance and care to keep them in good condition. One tool useful for keeping a turf surface healthy is an aerator, a device that punches holes in the turf surface and pulls out plugs of grass and soil. Plugging a turf surface in this manner allows air and moisture to penetrate the ground more quickly than an unaerated surface and also allows fertilizer to get down to the roots of the grass.

The plugs removed by an aerator are typically about five-eighths inch in diameter and one to four inches long, and these plugs are formed about four inches apart on a ground surface. Picking up and disposing of the plugs is expensive and removes and wastes valuable nutrients. However, until the plugs break down under the influence of sun, rain, and wind, they can interfere with the use of the turf. This problem is particularly pronounced when a golf course green is aerated, since plugs lying on the green would make putting nearly impossible. Attempts have therefore been made, with mixed success, to chop up the plugs and return the materials to the turf surface.

While flail type machines have been used for this purpose, they have not been very effective for a breaking up and redistributing of the plugs and thatch, particularly under wet or damp conditions. It is also has been proposed to use drag mats or blowers, both of which have also proved to be generally ineffective in properly removing the debris. Further, such procedures, at best, merely accumulate the debris to the side of the green or in the rough where the material is frequently left to slowly decompose, or must be manually removed. It would therefore be desirable to provide a apparatus for effectively comminuting plugs and grass and returning the comminuted material to a turf surface in a manner that does not interfere with the use of the turf surface.

SUMMARY OF THE INVENTION

The present invention is directed to a comminuting mechanism having a mobile support structure movable along a path of travel on a ground surface. A rotatable drive shaft is mounted within a housing and extends transversely of the path of travel and is supported by the mobile support structure. The comminuting mechanism further includes a mechanism such as a gasoline engine for rotating the rotatable shaft. The comminuting mechanism also includes a plurality of pulverizing blades, each having a hub with a central opening for mounting on the rotatable shaft within the housing. Each pulverizing blade includes a plurality of arms extending radially from the hub. A first set of straight arms radiates in the plane of the hub. Between each pair of straight arms lays a blade with an end or tip portion angled toward a first side or a second side of the plane of the hub. The direction of the angled arms alternates around the blade. The pulverizing blades are preferably mounted on the shaft so that the arms of adjacent blades are slightly offset rotationally from one another. Most if not all the straight arms include planar fan members mounted perpendicularly to the plane of the blade for creating an airflow into the housing when the shaft rotates.

The mechanism further includes a debris receiving opening in the bottom of the housing extending in the direction of the rotatable shaft for receiving ground debris along the path of travel substantially at ground level. The rotation of the blades and their fan members creates an airflow into the housing and helps draw grass plugs and other debris into the housing where they are pulverized by the action of the rotating blades and/or by collisions with the housing. After a partial circuit or one or more circuits around the rotating shaft, the pulverized debris is discharged through an outlet opening in the direction opposite to the direction of travel of the vehicle.

BRIEF DESCRIPTION OF THE DRAWINGS

The above-described and other features and advantages of the present invention will be appreciated and understood by those skilled in the art from the detailed description of the invention that follows and the following drawings wherein:

FIG. 5 is an elevation view, partly in section, taken in the direction of line 5—5 in FIG. 3;

DETAILED DESCRIPTION OF THE PREFERRED EMBODIMENT

Figure 1:
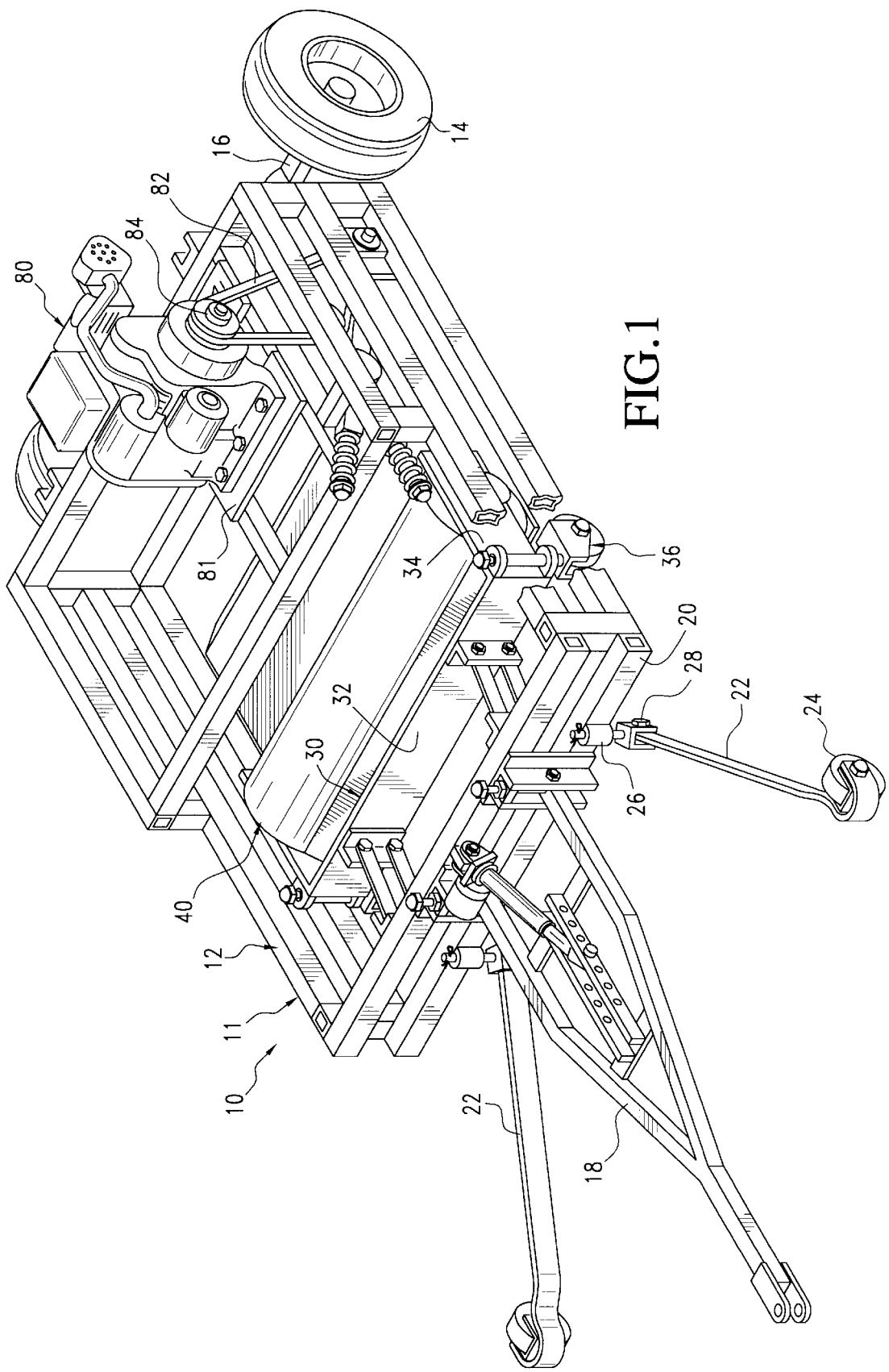
FIG. 1 is a perspective view of a mobile comminuting mechanism according to the present invention.

Referring now to the drawings, wherein the showings are for the purpose of illustrating a preferred embodiment of the invention only, and not for purpose of limiting the same, FIG. 1 shows the comminuting mechanism 10 of the present invention. Comminuting mechanism 10 includes a mobile frame 11 formed of welded bars 12, preferably hollow so as to minimize the weight of comminuting mechanism 10. Mobile frame 11 includes a pair of support wheels 14 mounted on a transverse axle 16 which support the rear of mobile frame 11. While similar wheels may also be provided for the forward end of mobile frame 11, in this embodiment a tractor hitch 18 is utilized both for engaging a towing vehicle and for supporting the forward end of mobile frame 11.

The forward or front end of mobile frame 11, from a lower cross rail 20 thereof, mounts a pair of laterally spaced and forwardly diverging gathering arms 22, each with an outer ground engaging support roller 24. Arms 22 may be transversely arced to provide a concave inner face to inwardly gather the encountered debris with a central directing thereof toward the advancing mobile frame 11. Support rollers 24 preferably project only slightly below the forward ends of arms 22 providing for a proper gathering of the materials without an actual scrapping engagement with the ground surface. Appropriate vertical and rotational supports 26 may be provided on the inner ends of arms 22 for adjustment both with regard to the height thereof and the lateral spread. Arms 22 are pivotally mounted to supports 26, as indicated at reference numeral 28, for vertical pivotal movement thereof to provide a floating action and to accommodate ground surface irregularities.

Mobile frame 11 further comprises an inner floating frame 30 positioned transversely across mobile frame 11 between the side rails and across substantially the entire interior width thereof in spaced relation rearward of the front end of mobile frame 11. Floating frame 30 includes front and side panels 32 and 34. A pair of vertically adjustable ground engaging wheel assemblies 36 are mounted to opposed side panels 34 and provide the principal support for inner floating frame 30. A hood 70 is connected between side panels 34 and will be described in more detail hereinafter. Front panel 32 is engaged in a trailing relationship to the front of mobile frame 11 and the front face of front panel 32 itself. Floating frame 30, thus supported, will tend to float on wheel assemblies 36 to accommodate to any changes in ground contour.

Figure 3:
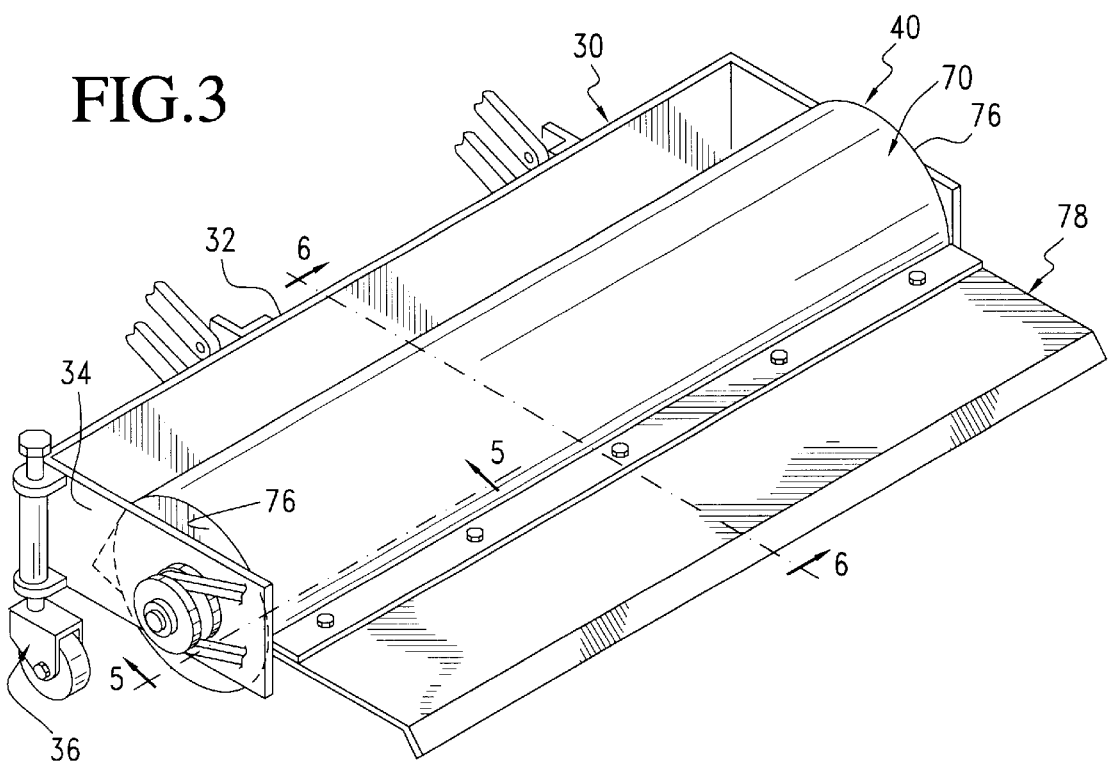
FIG. 3 is a perspective view of a pulverizing apparatus of the mobile comminuting mechanism shown in FIG. 1.
Figure 4:
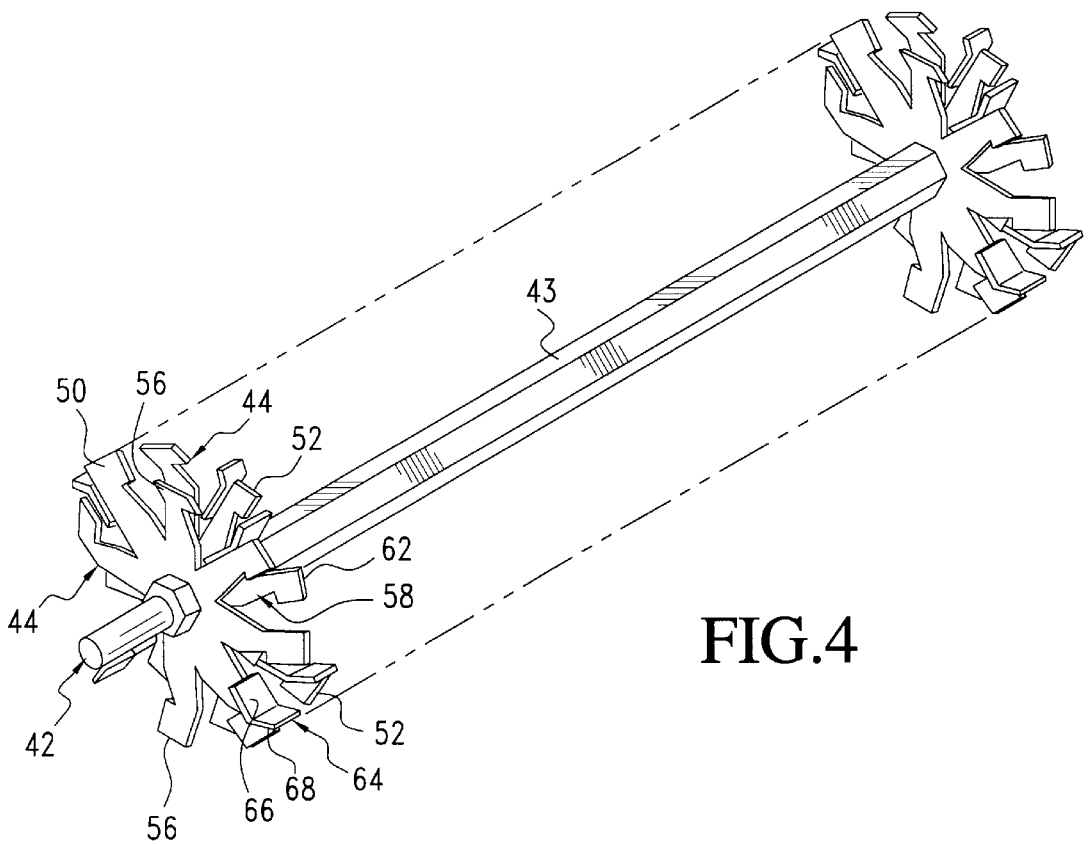
FIG. 4 is a perspective view of the pulverizing blades mounted on a central drive shaft.

Referring now to FIGS. 3–5, comminuting mechanism 10 further includes a comminuting apparatus 40 mounted within hood 70 supported by floating frame 30 between side panels 34 and immediately rearward of front panel 32. Comminuting apparatus 40 includes a central drive shaft 42 preferably having a circular cross-section and spanning the width of comminuting apparatus 40 inside hood 70. Alternatively, central drive shaft 42 may have a rectangular or hexagonal cross section 43 for substantially the entire length thereof providing a slip free engaging outer surface for mounting the blades on the drive shaft.

Comminuting apparatus 40 further includes a plurality of pulverizing blades 44 each comprising a central hub portion 46 having a central opening 48 and a plurality of blade arms 50 extend radially from hub portion 46 substantially in the plane of hub portion 46. Pulverizing blades 44 further comprise a plurality of blade arms 54 having first portions laying in the plane of hub 46 and tip portions 56 angled in a first direction with respect to the plane of the hub, and a plurality of blade arms 58 having first portions 60 laying in the plane of hub 46 and second portions 62 angled in a second direction with respect to the plane of the hub. The blades are arranged around the circumference of the hub so that either a blade arm 54 or a blade arm 58 lies between each pair of blade arms 50. Furthermore, the direction of blade arms 54 land 58 alternates around the circumference of the blade. Thus in a preferred embodiment, a blade arm 50 lying in the plane of the hub is followed by a blade arm 54 with its tip angled in a first direction, another blade arm 50 in the plane of the hub, and a blade arm 58 having its tip angled in the second direction with respect to the hub. This arrangement continues around each pulverizing blade 44. Furthermore, adjacent ones of pulverizing blades 44 are mounted on shaft 42 in an axially and circumferentially offset arrangement so that a blade arm 54 is located between a pair of blade arms 50 and 58 on adjacent pulverizing blades. Pulverizing blades 44 are preferably manufactured out of metal, such as to steel, and may have a diameter of about 12 to 16 inches.

Pulverizing blades 44 are mounted on the drive shaft so that the rotation of the shaft rotates the blades. The alternating arrangement of arm tips 56, 62 provides for a wider pulverizing range for each blade along the central drive shaft 42. It is preferable that the angled tip portions deviate from the plane of hub 46 by an angle of deflection θ of between about 130 to 170 degrees.

Each pulverizing blade 44 further comprises a plurality of airflow generating elements 64 fixedly secured along the trailing edge of straight arms 50 such as by welding. Airflow generating portions 64 are preferably disposed on alternating straight arms 50 on most if not all of pulverizing blades 44. It should be appreciated that airflow generating portions 64 may also be disposed on the angled blade arms 54, 56 if desired. Each airflow generating portion 64 includes a flat portion 66 and an angled portion 68 attached to flat portion 66 at an obtuse angle. Furthermore, the obtuse angle faces in the direction of travel of the vehicle when the blade is proximate the ground and opposite to the direction of rotation of the blade. As will be explained hereinafter, airflow generating portions 64 create a positive airflow into the housing which helps draw debris into the housing where it is pulverized and then discharged to the rear of the vehicle.

Hood 70 arcs upwardly and rearwardly over the pulverizing units from the upper edge of an open mouth 72 to a rear discharge end 74, and further spans the length of central drive shaft 42. An arcuate plate 73 with a flat forwardly directed edge portion assists in scooping the ground debris through open mouth 72. Arcuate plate 73 is preferably attached to side panels 34 at opposing sides. Hood 70 includes a pair of end panels 76 which are co-planar and attach to side panels 34 for attaching hood 70 thereto. Hood further includes a rectangular flap 78 secured to and extending from the edge of rear discharge end 74 assisting in the pulverized material in being directed toward the ground. A forward flap 75 overhanging slightly above open mouth 72 and preferably attached as an right angle to hood 70 helps direct air toward the rotating blades and keeps debris from being deflected forwardly.

In order to drive the comminuting mechanism, an appropriate power source, such as a gasoline engine 80, is used. As illustrated, engine 80 can be mounted on an elevated platform 81 constituting a portion of mobile frame 11 rearward of the mechanism. Power transfer between engine 80 and central drive shaft 42 of comminuting apparatus 40 can be effected by one or more drive belts 82 engaged between a drive pulley 84 on engine 80 and drive pulley 86 mounted on one end drive shaft 42 beyond one of side panels 34 of floating frame 30.

As will be appreciated, drive shaft 42, at the drive end, will extend, utilizing appropriate bearing supports, through the corresponding side panel 34. The opposite end of drive shaft 42 will be appropriately bearing supported in the opposed side panel 34 of floating frame 30.

Figure 2:
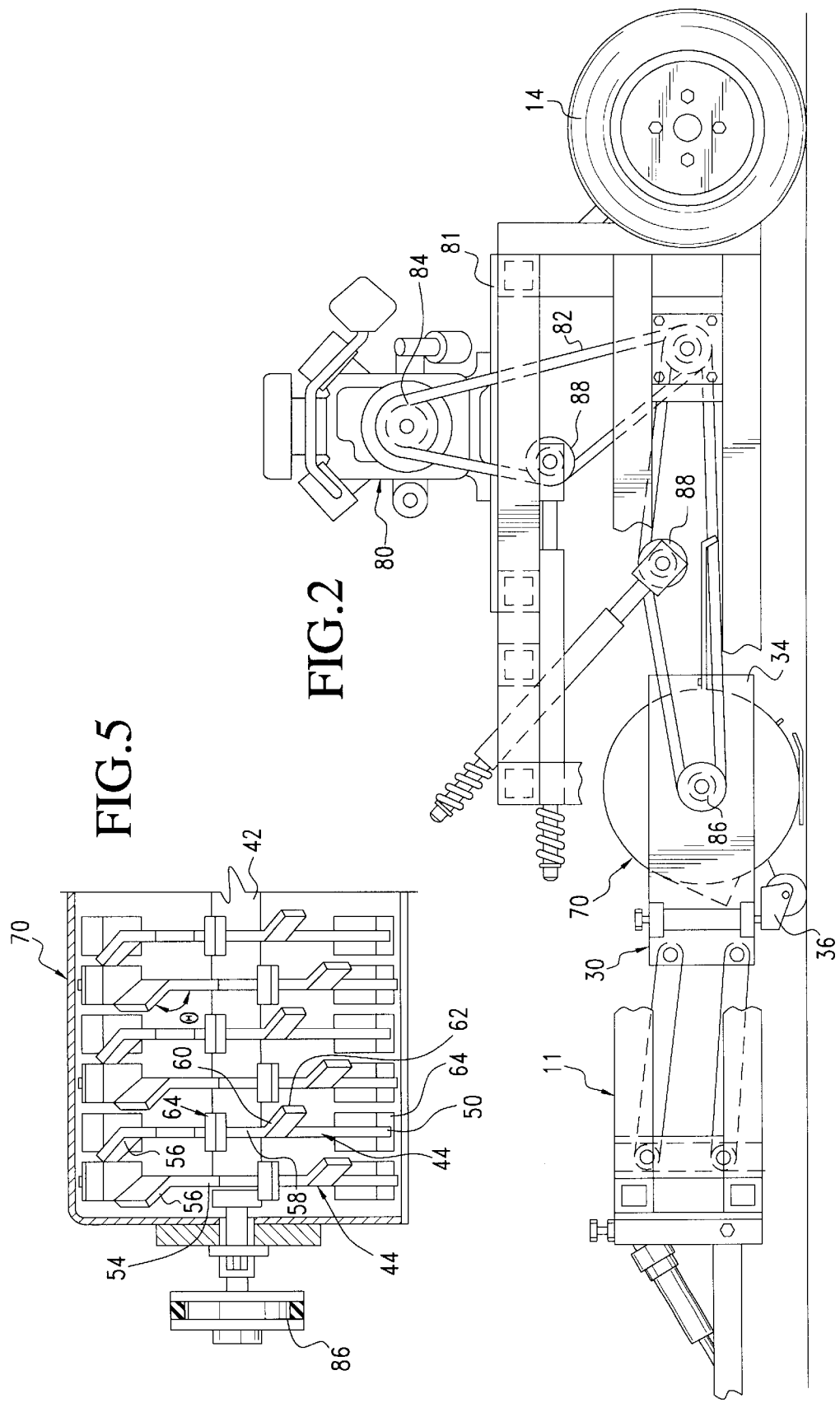
FIG. 2 is a side elevational view of the mobile comminuting mechanism illustrated in FIG. 1.

Referring to FIG. 2, a plurality of appropriate spring loaded idler pulleys 88 are used as required to maintain belt tension as the mechanism moves across the ground and accommodate itself to varying ground conditions.

Figure 7:
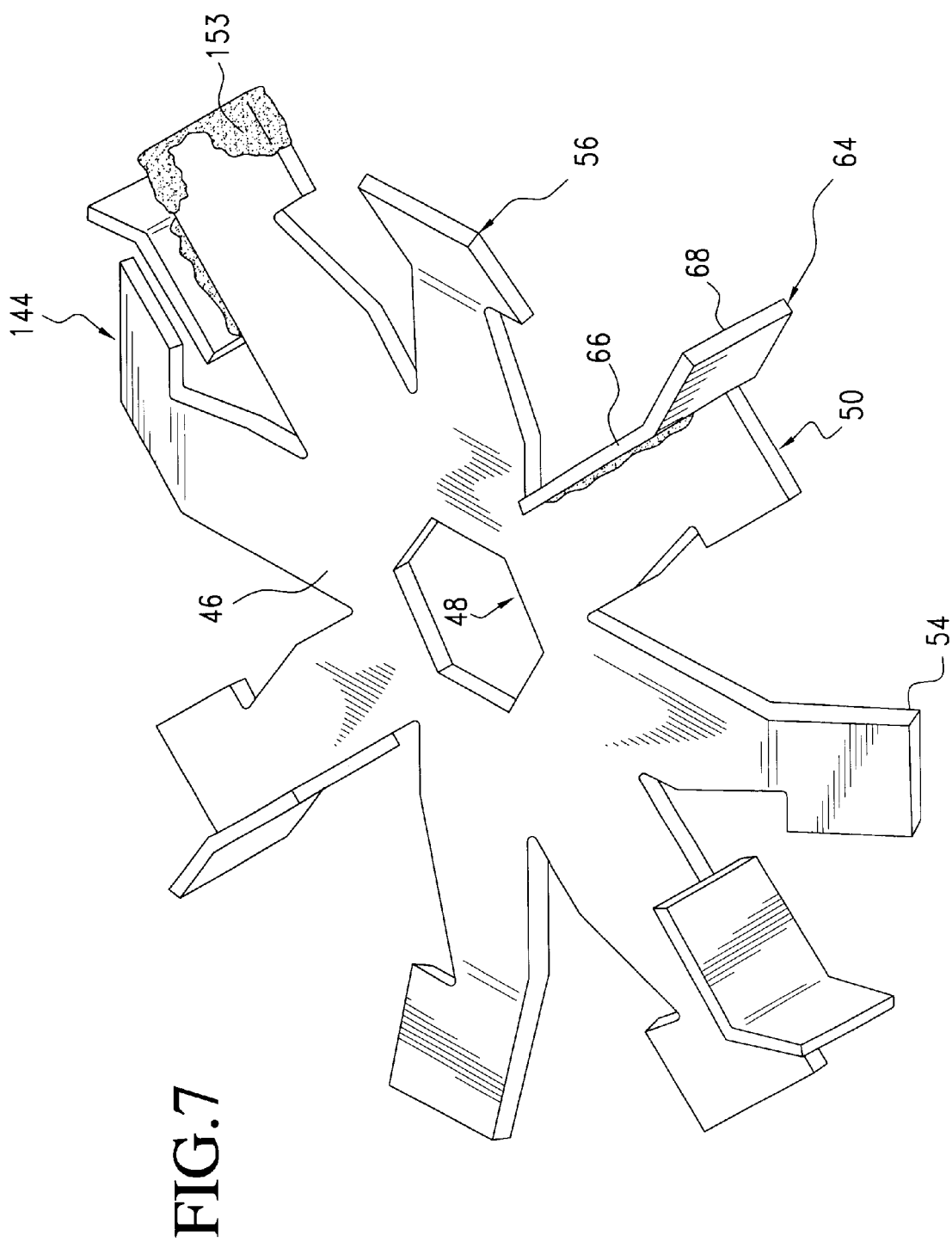

Referring to FIG. 7, an alternative embodiment of pulverizing blade is illustrated at 144. Here, similar or analogous features are labeled in multiples of 100. In this embodiment, it is contemplated that the tip of straight arms 152 be covered with carbide material 153 to enhance the durability of the blade arm.

Figure 6:
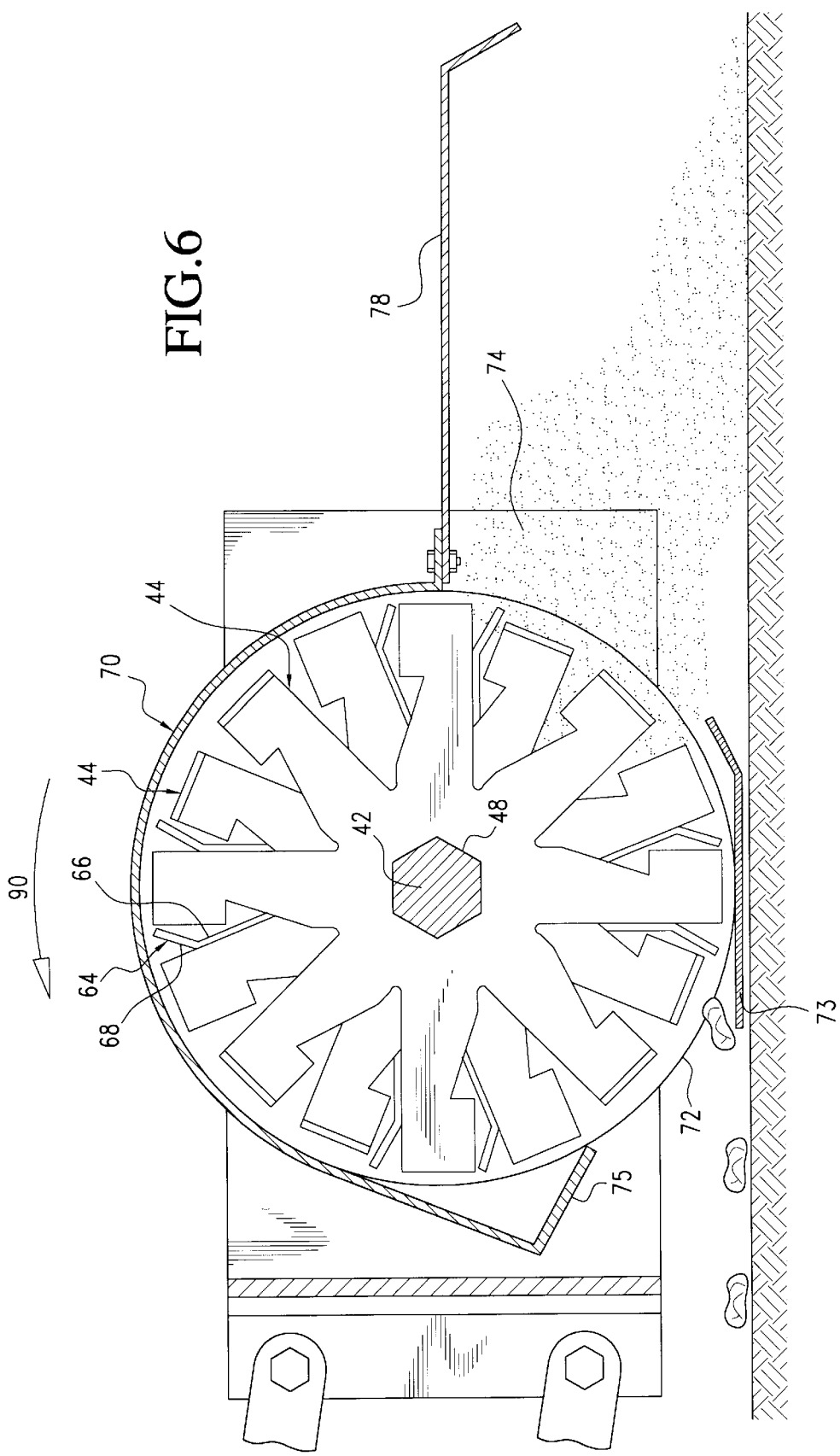
FIG. 6 in a sectional side elevation view taken in the direction of line 6—6 in FIG. 3; and, FIG. 7 is a perspective view of a second embodiment of pulverizing blade for use with the present invention.

Turning now to the operation of comminuting mechanism 10, Was mobile frame 10 is moved along a path of travel by an appropriate towing vehicle, central drive shaft 42 is rotatably driven so that the blade arms 54 closest to the ground move in a direction opposite to the direction of vehicle travel (counter clockwise as viewed in FIG. 6 and shown by arrow 90). Drive shaft 42 and the pulverizing blades rotate at approximately 2800 rpm. Operating in this manner, it has been found that a positive air flow, produced by airflow generating portions 64, in conjunction with the forward movement of the mechanism, effectively picks up and draws debris, including the plugs, balled thatch and the like through open mouth 72 and into hood 70. Once through open mouth 72, the debris is pulverized by the blades of the pulverizing units which quickly breaks the material down into small pieces.

The apparatus thus described, is considered to be a particularly significant addition to golf course grooming equipment in that it both reduces manual labor golf course down time and helps the environment as well.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to construed as limiting to the invention as defined by the several claims appended hereto.

What is claimed is:

1. A comminuting machine for pulverizing ground debris, comprising:
    a mobile support structure movable along a path of travel on a ground surface;
    a drive shaft supported by said mobile support structure transversely of said path of travel;
    means for rotating said drive shaft, said means secured on said mobile support structure;
    a plurality of blades mounted on said drive shaft for axial rotation therewith;
    a mouth for collecting ground debris disposed frontwardly of said blades, adjacent the ground;
    a discharge for comminuted debris disposed rearwardly of said blades;
    a plate disposed generally beneath said blades extending from the mouth at a front portion of the plate to the discharge at a rear portion of the plate, the plate being angled upwardly toward the discharge at the rear portion thereof; and
    an arcuate hood coextensive with the length of said drive shaft in an outwardly spaced relation thereto to define an arcuate air chamber extending from the mouth over the blades to the discharge, said air chamber and said airflow generating elements serving to enhance collection of ground debris and discharge of pulverized ground debris.

2. The comminuting mechanism of claim 1 wherein each of said plurality of pulverizing blades further comprises:
    a hub portion lying in a plane;
    a plurality straight arms; and,
    a plurality of arms each having an angled tip portion.

3. The comminuting mechanism of claim 2 wherein said plurality of arms each having an angled tip portion comprises a first set of arms having a tip portion angled in a first direction with respect to the plane of the hub and a second set of arms having a tip portion angled in a second direction with respect to the hub.

4. The comminuting device of claim 3 wherein said one of said plurality of arms having an angled tip portion is located between each pair of said plurality of straight arms.

5. The comminuting mechanism of claim 1 further comprising:
    a base and including said mouth and said discharge, said mouth being configured to receive debris substantially at the ground level.

6. The comminuting mechanism of claim 2, wherein adjacent pulverizing blades of said plurality of pulverizing blades are oriented so that said plurality of arms having an inwardly deflected tip are disposed in a spaced relation with a gap between said straight arms and said arm having an inwardly deflected tip of the other of pulverizing blade.

7. The comminuting mechanism of claim 2, wherein said plurality of pulverizing blades further comprises an airflow generating blade on each of said straight arms.

8. The comminuting machine of claim 1 wherein each said blade includes a pulverizing portion and an airflow generating element.

9. The comminuting machine of claim 1 further comprising a forward flap attached at an angle to the arcuate hood and overhanging the mouth, said flap serving to direct air towards the blades and prevent comminuted debris from being deflected forwardly.

10. A comminuting mechanism, comprising:
    a mobile support structure movable along a path of travel on a ground surface;
    a drive shaft laterally supported by said mobile support structure transversely of said path of travel;
    means for rotating said drive shaft, said means secured on said mobile support structure;
    a plurality of pulverizing blades each having an axial bore for mounting said pulverizing blades on said drive shaft, each of said pulverizing blades comprising a plurality of straight extending arms alternately disposed with respect to a plurality of inwardly deflected arms and a plurality of outwardly deflected arms;
    an arcuate hood coextensive with the length of said drive shaft in an outwardly spaced relation thereto;
    a mouth for collecting ground debris disposed forwardly of said blades, adjacent the ground;
    a discharge for comminuted debris disposed rearwardly of said blades;
    a plate disposed generally beneath said blades extending from the mouth at a front portion of the plate to the discharge at a rear portion of the plate, the plate being angled upwardly toward the discharge at the rear portion thereof; and
    a base having a debris receiving opening extending axially along said rotatable shaft, said base secured to said mobile support structure, said debris receiving opening being configured to receive ground debris along said path of travel substantially at the ground level surface whereby, upon rotation of said shaft, said received ground debris is pulverized by the rotation of said plurality of pulverizing blades and discharged through an outlet opening.

* * * * *